United States Patent [19]

Montalvo, III et al.

[11] Patent Number: 5,186,061
[45] Date of Patent: Feb. 16, 1993

[54] TRANSDUCER BEAM AND BEAM ASSEMBLY

[75] Inventors: William W. Montalvo, III, Raymond; Philip R. Metcalf, Jr., Portland, both of Me.

[73] Assignee: The Montalvo Corporation, Portland, Me.

[21] Appl. No.: 644,952

[22] Filed: Jan. 23, 1991

[51] Int. Cl.⁵ .............................................. G01L 1/04
[52] U.S. Cl. ........................ 73/862.632; 73/862.627; 73/862.637
[58] Field of Search ........... 73/862.39, 862.45, 862.48, 73/862.54, 862.55, 862.65, 862.66; 177/229; 338/5, 862.391, 862.451, 862.474, 862.55, 862.627, 862.632, 862.636, 862.637, 862.638

[56] References Cited

U.S. PATENT DOCUMENTS

| 3,031,152 | 4/1962 | Cohen et al. | 73/862.65 X |
| 3,824,846 | 7/1974 | Anderson | 73/862.48 X |
| 4,448,085 | 5/1984 | Lee | 177/229 X |

FOREIGN PATENT DOCUMENTS 2510913 9/1976 Fed. Rep. of Germany .

Primary Examiner—Herbert Goldstein
Assistant Examiner—Elizabeth L. Shopbell
Attorney, Agent, or Firm—Brooks Haidt Haffner & Delahunty

[57] ABSTRACT

A transducer employs a beam with spaced, parallel end portions interconnected by a middle portion disposed at an angle of about 45° with respect to the end portions. Strain gages are mounted on the middle portion of the beam. The transducer can be employed for measuring and monitoring forces acting on a shaft.

14 Claims, 3 Drawing Sheets

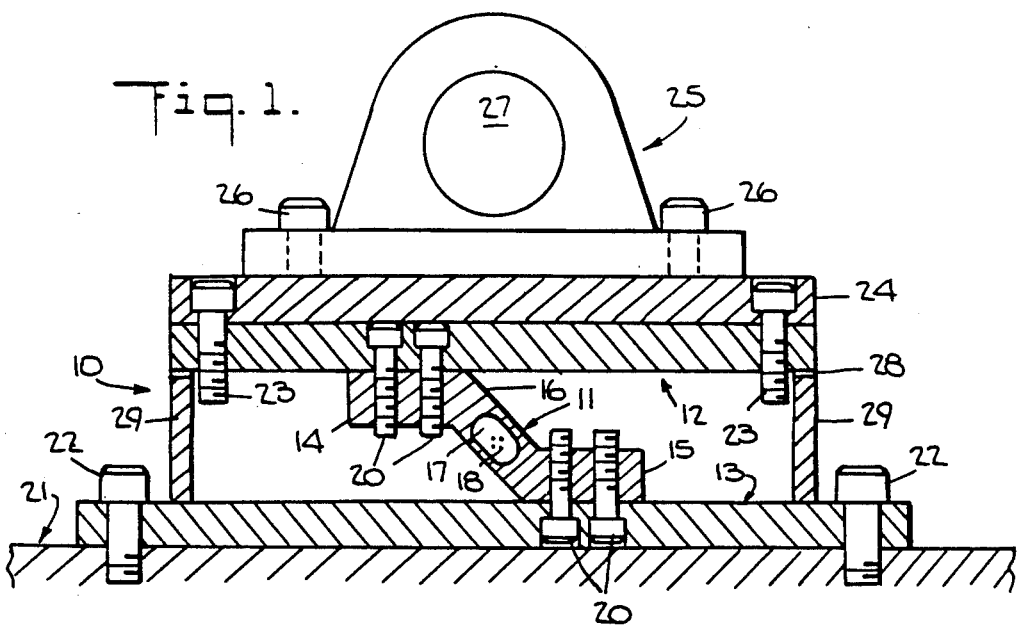
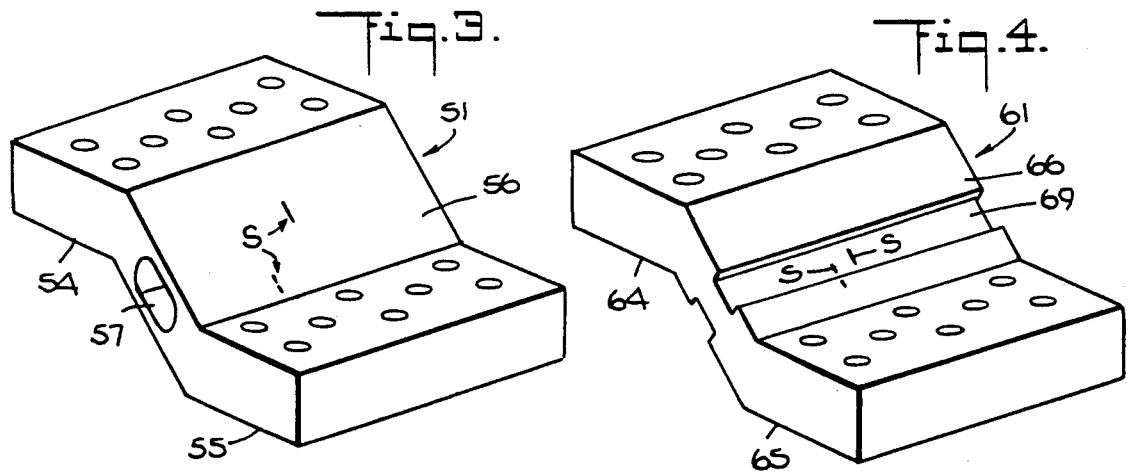
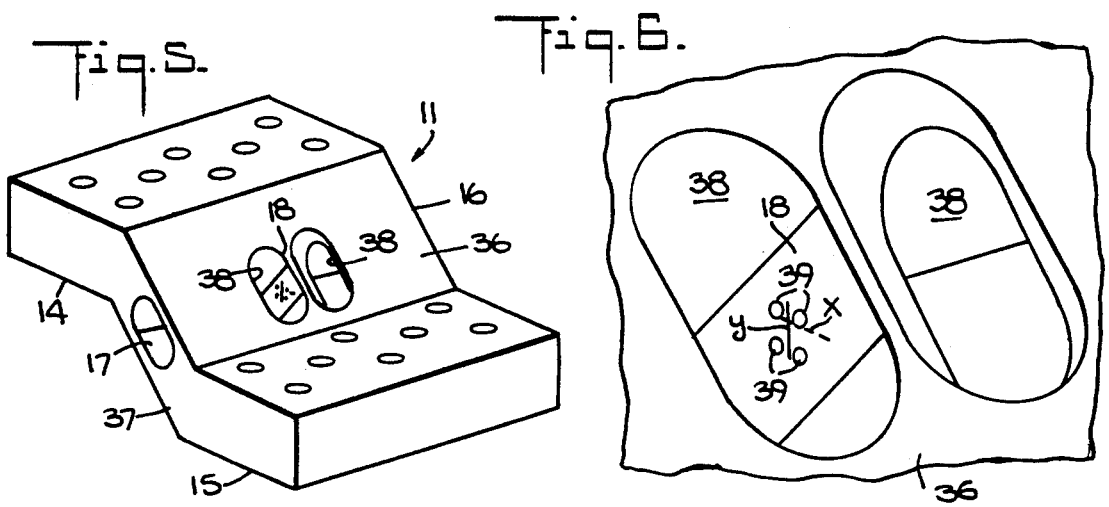

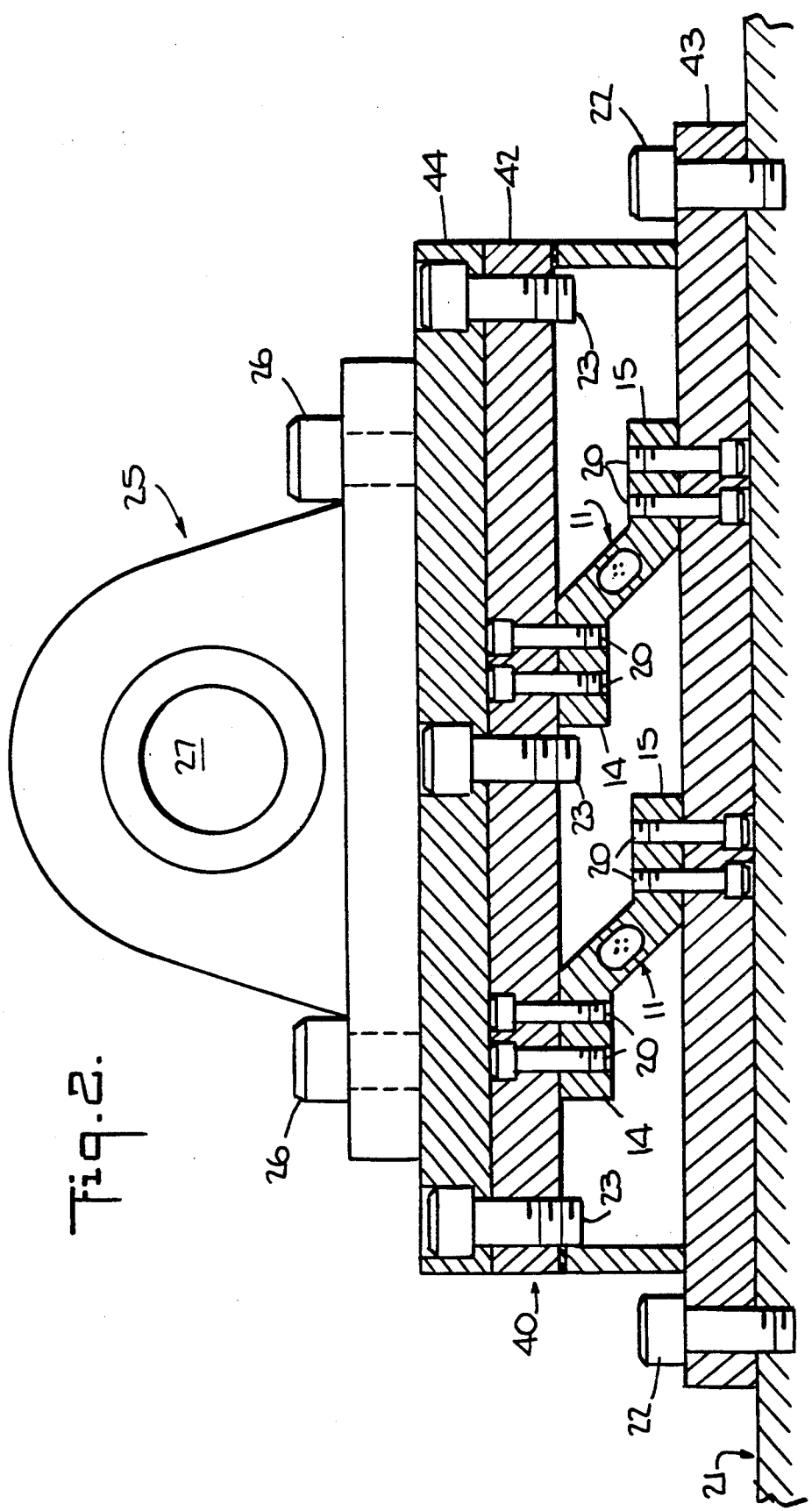

TRANSDUCER BEAM AND BEAM ASSEMBLY

BACKGROUND OF THE INVENTION

1. Field of the Invention

The invention relates to measurement of forces acting on a shaft by means of a transducer.

2. Discussion of the Prior Art

Various arrangements using transducers to convert sensed mechanical forces into electrical signals have been used to measure forces acting on shafts. One important application of such transducer arrangements is the monitoring of tension in a web passing over a roll by measuring the force imposed on the roll by the moving web. Strain gages have been positioned within roll ends and in roll shaft supporting joints beyond the ends of rolls for sensing the force exerted on a roll by a web moving over and carried by the roll. Signals from such strain gages can be monitored and web tension can be adjusted accordingly.

U.S. Pat. No. 3,260,106 shows strain gages mounted on a deflectable member within a cap at the end of a roll shaft. Electrical signals from the strain gages are transmitted to an electrical bridge circuit such as a Wheatstone bridge circuit. Other strain gage arrangements are shown in U.S. Pat. Nos: 3,763,701; 4,052,891; 4,130,014; 4,326,424; 4,674,341 and 4,691,579. The applicants' prior application, Serial No. 607,513 shows another kind of strain gage arrangement for monitoring web tension.

SUMMARY OF THE INVENTION

The transducer assembly of the invention can be used in conjunction with a pillow block mounting for a roll shaft, such as the shaft of an idler roll. The assembly is disposed between a shaft bearing and a machine frame or other fixed structure.

The transducer assembly employs one or more beams. The beam has two spaced, parallel end portions and a middle portion extending between the two end portions and disposed at an angle thereto. The end portions of the beam are secured to flat top and bottom plates respectively. The bottom, or base plate is adapted to be fixedly secured to a machine frame element or other fixed structure. The top plate is preferably secured, through an intermediate member, to a bearing for the end of a shaft, the load on which is to be measured.

Strain gages, which can be conventional solid state devices, are associated with the middle portion of the beam. Depending upon which of several beam configurations is employed, the strain gages are mounted in one way or another to sense strain in the middle portion of the beam at a web portion of the beam.

Shield members preferably extend upward from the base plate, surrounding the beam, and a gasket is located between the shield members and the top plate, allowing some relative vertical motion of the top plate with respect to the base plate.

The strain gages are electrically connected to electrical monitoring circuitry, which includes bridge circuitry, and which can include meter and/or alarm means located remotely from the transducer assembly.

Forces acting on a shaft carried by the bearing are communicated to the beam and sensed by the strain gages, which produce an electrical voltage signal which is a measurement of the forces, and operation of the shaft or other associated equipment can be adjusted accordingly, for example, to adjust or stabilize tension in a web carried by a roll associated with the shaft.

Since no special couplings, joints or shafts are employed, the transducer of the invention is simpler than many prior art mechanisms, and can readily be used in conjunction with existing machinery. The possibility of using any desired number of the beams of the invention in a transducer assembly, depending upon the application, eliminates the need for a large inventory of different specialized parts. These and other advantages of the transducer beam and beam assembly of the invention will be more fully understood when the following detailed description of preferred embodiments is read in conjunction with the accompanying FIGURES of the drawing.

BRIEF DESCRIPTION OF THE DRAWINGS

In the drawings, in which like reference characters designate like parts throughout:

FIG. 1 is a side view, in cross-section of a transducer assembly according to the invention;

FIG. 2 is a side view in section of a transducer assembly according to the invention with two beams.

FIG. 3 shows a modified form of beam according to the invention in perspective.

FIG. 4 is a view in perspective of another embodiment of the beam of the invention.

FIG. 5 is a view in perspective of a presently preferred beam according to the invention.

FIG. 6 is a view in detail of a web portion of the beam of FIG. 5.

DETAILED DESCRIPTION OF PREFERRED EMBODIMENTS

Figure 7:
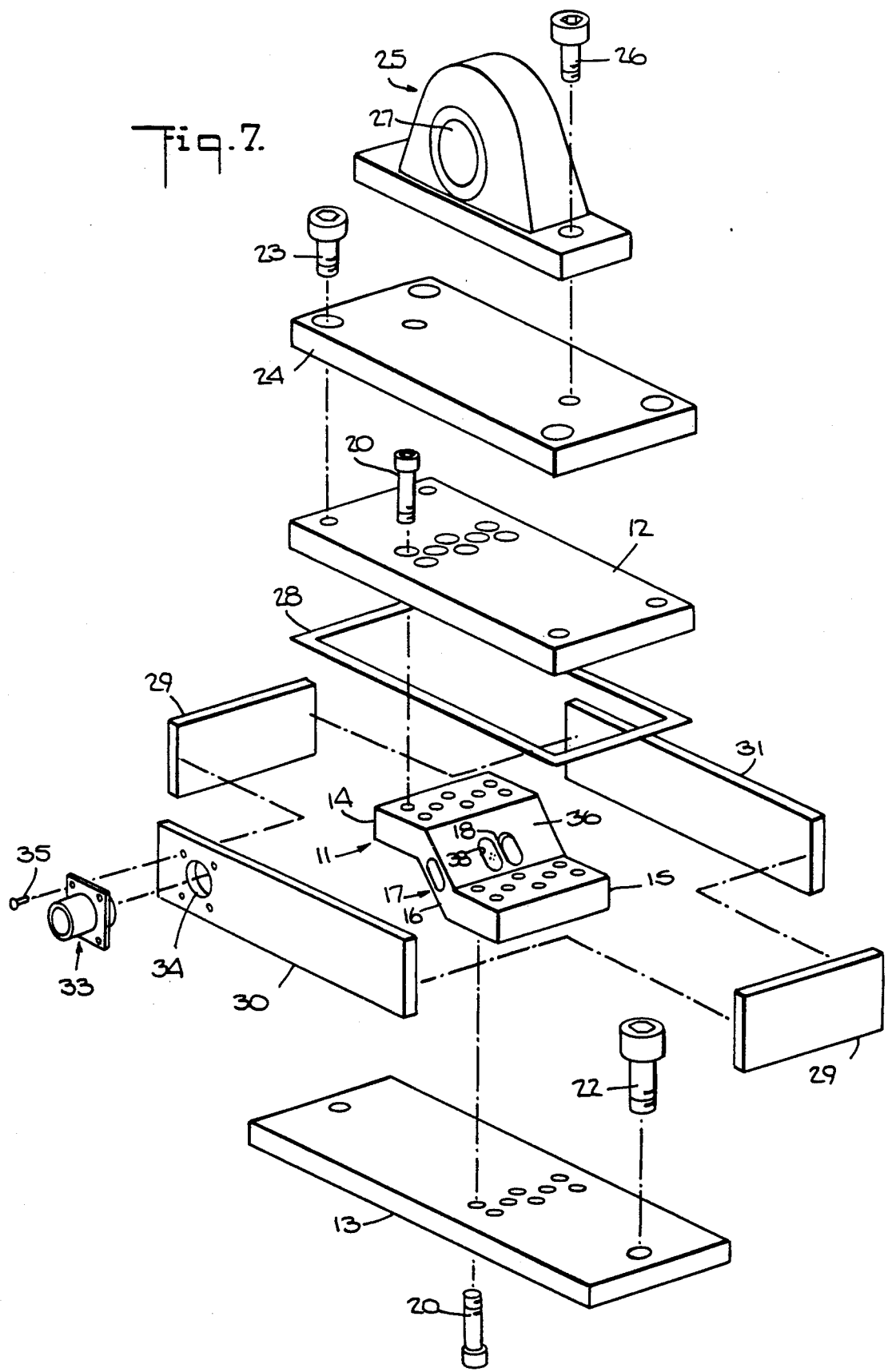
FIG. 7 is an exploded view, in persepective, of the transducer assembly of FIG. 1.

In the sectional view of FIG. 1, the transducer assembly generally designated by the reference numeral 10, is shown in comprise a profiled beam, generally designated 11 secured between a top plate member 12 and a bottom plate, or base plate 13.

The beam 11, shown as an integral member, is preferably symmetrical about its transverse center line, that is, a center line directed orthogonally to the plane of the illustration of FIG. 1, and has identical, parallel end portions 14 and 15 shown at the top and bottom of the beam 11 in FIG. 1. The end portions 14 and 15 of the beam 11 are interconnected by a middle portion 16 which extends at an angle therebetween. The middle portion 16 of the beam 11 is, as shown, somewhat thinner in cross-section than the end portions 14 and 15 and has a centrally disposed transverse passage 17 interrupted at the mid-point of the passage by a wall-like web 18 which is integrally formed with the beam 11 and which extends in a plane parallel to the plane in which the sectional view of FIG. 1 is presented. The passage 17 thus actually consists of two mutually aligned elongated bores through the middle portion 16 of the beam 11 extending toward each other from opposite sides of the beam 11 and separated by the web 18 at the inner ends of the bores. The web 18 of FIG. 1 is shown in greater detail in FIG. 6.

The end portion 14 of the beam 11 is secured to the top plate 12 by a plurality of screw fasteners 20, and the end portion 15 of the beam 11 is secured to the base plate 13 by a similar plurality of fasteners 20. The base plate 13 is fastened to a fixed frame member 21 by screw fasteners 22 and the top plate 12 is fastened by screw fasteners 23 to a plate member 24. A bearing, shown as a conventional pillow block bearing 25, is mounted on the plate member 24 and secured thereto by screws 26. The details of the bearing 25 are not illustrated, since they will be understood by those acquainted with the art, but it can be seen that the bearing 25 has a cylindrical bore 27 for receiving a shaft (not shown).

All of the elements described in the foregoing discussion are suitably formed of metal, such as aluminum or steel. The beam 11 is preferably formed of aluminum. FIG. 1 also shows a gasket 28 of rubber or other elastomeric material interposed between the top plate 12 and rectangular end shield members 29. The gasket 28 allows a small amount of relative movement of the top plate 12 with respect to the base plate 13 in response to load on a shaft and hence on the bearing 25, which force, in turn, produces strain on the beam 11.

The exploded view of FIG. 7 shows that besides the end shield members 29, the assembly of FIG. 1 includes front and back shield members 30 and 31 respectively, which, together with the end shield members 29, serve to enclose the beam 11. The gasket 28 is shown in FIG. 7 as having a rectangular shape to fit between the shield members 29, 30 and 31 and the top plate 12. Most of the screw fasteners are not illustrated in FIG. 7 for the sake of simplicity, but their location can be seen from the holes in which the fasteners are received.

The end shield members 29 and the front and back shield members 30 and 31 are preferably secured to the base plate 13 by welding or otherwise securely fastened thereto. Also shown in FIG. 7 is an electrical connector 33 which fits in an aperture 34 in the front shield member 30. The connector 33, through which electrical wires (not shown) pass from the inside to the exterior of the transducer assembly 10, can be held in place by screws 35, one of which is shown.

The beam 11 of FIGS. 1 and 7 is also shown in FIG. 5. As previously indicated, the end portions 14 and 15 of the beam are parallel to each other and interconnected by the slanting middle portion 16 through which the interrupted passage 17 extends. It will be seen that the passage 17 has the cross-sectional shape of an elongated oval, with the longer sides of the oval being parallel to the parallel upper face 36 and lower face 37 of the middle portion 16 of the beam 11. The passage 17 can also be considered as two aligned bores approaching, but not meeting each other, from opposite sides of the beam 11. There are also two bores 38, which are shaped as elongated ovals in cross section, passing through the middle portion 16 of the beam 11 and directed perpendicularly to the passage 17. These bores 38 are separated by the web 18.

The middle portion 16 of the beam 11 is preferably slanted at an angle of 45° with respect to the end portions 14 and 15. This angular relationship is most effective for response to forces acting on a shaft carried by the bearing 25 without regard to the orientation of the transducer beam 11 with respect to the shaft axis. Although the beam 11 is shown in the drawings aligned perpendicularly to the shaft axis, the beam 11 could have some other orientation, such as being aligned with the axis of a shaft or at any other angle with the beam's end portions 14 and 15 disposed in a plane parallel to the plane of the shaft axis.

Strain gages, which can be commercially available semiconductor devices, are located on opposite sides of the web 18 in the area indicated by the apertures 39 illustrated in the detail view of FIG. 6. As shown by the lines x and y in FIG. 6 the strain gages are offset from each other by an angle of 90 degrees.

The passage 17 through the middle portion 16 of the beam 11 and the bores 38 through the beam 11 which intersect the passage 17 render the middle portion 16 of the beam 11 somewhat flexible and responsive to forces transmitted to the beam 11 which represent loading of a shaft carried by the bearing 25. The strain gages at x and y sense mechanical stress in the web 18 and convert the stress felt into an electrical voltage signal which is carried by electrical wires (not shown) through the passage 17 and connector 35 to electronic circuitry for amplification and comparison of the signals from the gages on opposite sides of the web 18 by use of electrical bridge circuitry. The measurements resulting from processing the signals representing strain on the web 18 are indicative of the forces acting on a shaft mounted in the bearing 25 and adjustments can be made if the measured forces on the shaft differ from a desired value.

FIG. 2 shows a transducer assembly generally designated by the reference numeral 40, which employs two of the beams 11 which function in the same manner as in the embodiment of FIG. 1. The transducer assembly 40 of FIG. 2 can be used in measuring shaft forces greater than those for which the assembly 10 is intended to be employed. Top and base plates 42, 43, similar to, but larger than the corresponding plates 12 and 13 are employed in the embodiment of FIG. 2, and the plate 44 corresponds to the plate 24 of FIG. 1. It will be understood that depending upon the application and the magnitude of shaft load to be detected, any number of the beams 11 can be arranged between top and base plates such as the plates 12, 13, and 42, 43. When two or more beams 11 are employed, they need not be arranged in a line as illustrated in FIG. 2, but can be arranged side by side or in any other desired relationship, provided that the end portions 14 and 15 of the several beams 11 are coplanar.

FIGS. 3 and 4 show modifictions of the beam which can be employed in the transducer assembly 10 of the invention. The beams of FIGS. 3 and 4 can be substituted for the beam 11 of FIG. 5 without any other modification of the transducer assembly.

Like the beam 11 of FIG. 5, the beam 51 of FIG. 3 has mutually parallel end portions 54 and 55 interconnected by a middle portion 56. The beam 51 differs from the beam 11 in that it has no bores corresponding to the bores 38 of the beam 11, and also in that the passage 57 through the middle portion 56 of the beam 51 extends uninterrupted through the entire width of the beam 51. Strain gages s are located on opposite sides of the middle portion 56 of the beam 51 and arranged parallel to each other.

The beam 61 of FIG. 4 like the beams 11 and 51 has parallel end portions 64 and 65 interconnected by a middle portion 66, but the beam 61 has no passage corresponding to the passages 17 or 57. The middle portion 66 of the beam 61 is formed with a pair of channels 69 extending across the width of the beam 61 at its middle portion 66. Strain gages s are located on opposite sides of the beam 61 at the middle of the opposed channels 69.

The beams 51 and 61 of FIGS. 3 and 4 are simpler to manufacture than the beam 11 and may be suitable for certain applications. What all of the transducer assembly beams described have in common is the offset, parallel end portions interconnected by a middle portion forming an angle, preferably 45° with the end portions.

Although certain preferred embodiments of the transducer assembly and beam for use in such an assembly have been described in detail, various modifications and variations will suggest themselves to those acquainted with the art, such as, for example, the use of the transducer assembly with some other form of shaft mounting than the pillow block illustrated, or the use of the transducer assembly for measuring forces other than forces acting on a shaft.

What is claimed is:

1. A transducer for sensing mechanical force and producing a corresponding electrical voltage signal comprising a beam having horizontally displaced parallel opposite end portions interconnected by a straight middle portion disposed at an obtuse angle with respect to said end portions and strain gage means mounted on said middle portion.

2. The transducer of claim 1 wherein said middle portion has a passage extending across the width of the beam.

3. The transducer of claim 2 wherein the passage is interrupted by a web.

4. The transducer of claim 3 and including bores extending perpendicular to said passage and intersecting said passage and wherein said web is located between said bores.

5. The transducer of claim 3 or 4 wherein said strain gage means are mounted on said web.

6. A transducer assembly including parallel top and bottom plates and a beam having horizontally displaced end portions secured to said plates, said beam having a straight middle portion interconnecting the end portions and disposed at an obtuse angle with respect to said end portions, and strain gage means on said middle portion.

7. The assembly of claim 6 wherein there is a transverse passage through said middle portion.

8. The assembly of claim 7 wherein the transverse passage is interrupted by a web and said strain gage means is mounted on said web.

9. The assembly of claim 8 wherein bores extend perpendicular to said transverse passage and intersect the transverse passage, and said web is located between the bores.

10. A transducer assembly for measuring forces acting on a shaft, which includes means for mounting a shaft bearing, a top plate affixed to and beneath said mounting means, a beam extending from said top plate to a bottom plate, said bottom plate being adapted for mounting on a fixed structure, said beam including horizontally displaced parallel end portions secured respectively to said top and bottom plates and a straight middle portion interconnecting said parallel end portions and extending at an obtuse angle with respect to said end portions, and strain gage means on said middle portion.

11. The assembly of claim 10 wherein a passage extends transversely through said middle portion.

12. The assembly of claim 11 wherein said passage is interrupted by a web and said strain gage means is mounted on said web.

13. The assembly of claim 11 wherein bores extend perpendicular to the passage through the middle portion and interect with said passage, and the web is located between the bores.

14. The assembly of claim 1, 6 or 10 wherein said angle is about 135°.

* * * * *